United States Patent [19]

Dunn, Jr.

[11] 4,349,516

[45] Sep. 14, 1982

[54] PROCESS FOR TREATING THE GAS STREAM FROM AN ALUMINUM VALUE CHLORINATION PROCESS

[76] Inventor: Wendell E. Dunn, Jr., Box 534, Spearfish Canyon, S. Dak. 57783

[21] Appl. No.: 255,549

[22] Filed: Apr. 20, 1981

[51] Int. Cl.³ .............................. C01F 7/48; C01F 7/62
[52] U.S. Cl. ................................ 423/111; 423/133; 423/135; 423/463
[58] Field of Search ............... 423/111, 133, 135, 136, 423/496, 463, 500, 504

[56] References Cited

U.S. PATENT DOCUMENTS

| | | | |
|---|---|---|---|
| 1,875,105 | 8/1932 | Muggleton et al. | 423/136 |
| 1,901,486 | 3/1933 | Wurster et al. | 423/135 |
| 1,982,194 | 11/1934 | Brode et al. | 423/136 |
| 3,929,975 | 12/1975 | King et al. | 423/136 |
| 3,956,455 | 5/1976 | King et al. | 423/495 |
| 4,035,169 | 7/1977 | Sebenik et al. | 423/495 |

*Primary Examiner*—Herbert T. Carter
*Attorney, Agent, or Firm*—Lyne, Girard & McDonald

[57] ABSTRACT

A method for producing aluminum chloride suitable for direct introduction into an aluminum chloride reduction cell by treatment of the gas stream emerging from an aluminum value source chlorination process comprising the steps of:

1. reducing and condensing iron chloride in one or more iron chloride condensation stages;
2. absorbing the aluminum chloride contained in the gas stream under high temperature conditions with an alkali chloride or alkali chloride mixture to form an ionic alkali chloride-aluminum chloride complex; and
3. selectively condensing the chlorides from the product by step (2) to produce a purified aluminum chloride-alkali chloride complex suitable for direct introduction into an aluminum chloride reduction cell.

1 Claim, No Drawings

PROCESS FOR TREATING THE GAS STREAM FROM AN ALUMINUM VALUE CHLORINATION PROCESS

FIELD OF INVENTION

This invention pertains to the production of the aluminum chloride, more particularly to the purification of anhydrous aluminum chloride made by chlorination of aluminous ores at high temperture.

BACKGROUND OF THE INVENTION

Although it might be expected that the products of high temperature aluminous ore chlorination would be easily separable by differential condensation because of the large differences in boiling points of the product chlorides (iron, aluminum, silicon and titanium chloride), many difficulties are apparent to those who have attempted such separations. In fact, it has been conventional practice since before World War II to chlorinate Bayer process alumina product and not bauxite or some other less expensive aluminous ore to make aluminum chloride which can be used in reduction processes that convert aluminum chloride to aluminum metal.

Thus, the expense of the Bayer process is increased in order to purify the aluminum values in a stage preceeding chlorination. Even though the Bayer process is an established technology with a high tonnage base, the cost of this additional processing greatly reduces the potential savings of a chloride electrolysis process.

Considerable experimental effort, has been expended to test the possibility of using staged condensation to remove and reduce the impurity chlorides to a satisfactory level (J. Caby, Purification du Chlorure D'aluminium anhydry, diss. ethzurich, from NR. 3631-1965). This effort has not been successful even at laboratory scale. The existence of high temperature chloride vapor complexes between aluminum trichloride and various dichlorides has recently been discovered. Complexes between iron and aluminum trichloride are also now known as similar complexes with ferrous chloride. These complexes apparently defeat attempts to purify aluminum chloride by simple partial condensation. It has been proposed that rectification of aluminum chloride captured from the gas phase by a number of solvent complexing agents be used to purify aluminum trichloride for use in cells but this technique inevitably involves heat transfer into a highly corrosive liquid, $AlCl_3$. Even small amounts of aluminum trichloride in titanium tetrachloride will attack stainless steels, nickel and nickel-bearing alloys at highly unacceptable corrosion rates. This corrosivity has been known in the titanium chloride pigment industry for three decades.

Similarly, ferric chloride in solution in a sodium chloride complex is highly corrosive of stainless steels at tempertures near 250° C., and the aluminum chloride analogue would also be expected to corrode any metallic surface through which heat was being transferred, particularly when the aluminum chloride is present in amounts above the 1/1 ratio which forms the very stable complex $NaAlCl_3$. Thus any attempt at rectification must bring heat transfer surfaces into unacceptable corrosion conditions.

The literature is replete with attempts to partially chlorinate aluminous ores in order to reduce the impurity content to acceptable cell levels. All these attempts have fallen well short of producing a material which is usable in an alumina reduction cell, even short of producing a feed to a second chlorination step which would be low enough in impurities to make an acceptable aluminum chloride.

Attempts to treat the gases from chlorination of aluminous ores before condensation have involved the use of reducing agents, particularly the use of aluminum metal. These efforts bring the added disadvantage of a costly reducing agent, the Al product itself. Experimental work has again not indicated that impurity separation by using reducing agents is particularly successful when faced with other than the inevitable iron chloride impurities.

Put succintly, the chlorination of aluminous ores to make aluminum chloride for cell reduction to aluminum metal has been obviously desirable from an economic standpoint, but the purification problem has eluded straightforward approaches to the extent that the economic penalty of adding Bayer processing has been incurred and had to be accepted.

Now, with the aluminum ore sources of good Bayer bauxite more expensive, less available, and more subject to political intervention, other aluminous ores are being considered. These new processes are generally even more expensive than present Bayer alumina processing. Conversely, the processing of these other aluminous ores and low grade bauxites unsuitable for Bayer processing is becoming more attractive by chlorination than by other means.

This brings to a focus the necessity for a good process to produce an acceptable pure aluminum chloride cell feed by a process which eliminates the need for a Bayer process step or the production of an alumina starting material produced by an even more expensive process.

DETAILED DESCRIPTION OF THE INVENTION

My invention comprises a process capable of producing an aluminum chloride suitable for direct introduction into a reduction cell. According to this invention the gas stream emerging from a suitable aluminum value source chlorination process is treated by a process comprising the steps of:

1. reducing and condensing the iron chloride in one or more iron chloride condensation stages,
2. absorbing the aluminum chloride contained in the gas stream under high temperature conditions with an alkaki chloride or alkali chloride mixture to form an ionic alkali chloride-aluminum chloride complex and
3. selectively condensing the chlorides from the product of step (2) to produce a purified aluminum chloride-alkali chloride complex suitable for direct use in an aluminum chloride reduction cell.

This improved method for separating the aluminum chloride from the chlorinator gas stream with its chloride impurities is favorably affected not only by increasing the aluminum chloride boiling point, but by a change in the chemical nature of the aluminum chloride.

When absorbed with the alkali chloride to form a complex salt, the aluminum chloride changes from a covalent salt to a highly ionic salt. The uncomplexed (i.e. covalent) impurities in the gas stream remain in their original highly covalent state and exhibit extremely high apparent relative activities in the melt as compared to their activities in a liquid or solid solution of covalent (i.e. uncomplexed) aluminum chloride. This relative increase in apparent activity, in concert with the much higher temperature of condensation of the aluminum chloride values permits reduction of the impurity level in the aluminum chloride complex by more than an order of magnitude below the impurity level in the solid solution of uncomplexed (i.e. covalent) aluminum chloride.

Not wishing to be bound by theory, I believe that the complexed aluminum chloride in a 1/1 or higher alkali chloride-$AlCl_3$ ratio is entirely in the ionic form and that the rejection of a covalent molecule from either the melt or the solid solution enhances the apparent relative activity of these covalent impurities.

Similarly, the formation of the ionic complex binds the aluminum chloride so tightly that the vapor pressure is reduced several orders of magnitude over pure (i.e. uncomplexed) aluminum chloride. Consequently, the separation of aluminum chloride from the chlorinator gas stream can be accomplished at a much higher temperature than that used in the case where the pure uncomplexed aluminum chloride is condensed and separated from the gas stream.

In the process, the heat released from the condensation and exothermic complexing raises the reaction temperature of the mix without the introduction of further heat (a very difficult process under these corrosive conditions). This increase in temperature increases the saturation vapor pressures of the impurity chlorides and decreases their solubility in the aluminum chloride complex thereby enhancing the efficiency of the separation process.

One can condense the higher boiling impurity chlorides at a temperature near the aluminum chloride condensation temperature and have the advantage of an increased product condensation temperature and the added advantage of internally generated heat which allows the increased condensation temperature for aluminum chloride values to be used to advantage.

The complexing alkali chloride may be a lithium, sodium or potassium chloride as used in a reduction cell thereby permitting recycling of depleted cell melt to the absorption stage. The heat from the cell melt alkali chloride can be used to further add to the condensation stage temperature and may be adjusted by cooling the returning cell melt chloride to any desired temperature where the impurity level is acceptable. This will reduce vaporization losses of the alkali complex, though they are quite low in any case.

Among the advantages to the use of complexed aluminum chloride in the production of aluminum metal by the electrolysis of aluminum chloride is an improvement in the cell addition. The addition of a subliming solid to a high temperature cell bath has been described in U.S. Pat. No. 4,111,764. Complexing aluminum chloride with an alkali halide allows addition to the reduction cell of a liquid of reasonable melting point and high boiling point thus, eliminating the problems of aluminum chloride plugging and vaporization which are common in aluminum chloride electrolytic processes.

The decrease in melt temperature which occurs on dissolution of aluminum chloride in spent cell melt allows the transporting pipes to and from the cell to be cooled to prevent corrosion while allowing the much lower melting complex to be handled and its flow controlled easily. It may also be stored for reasonable lengths of time before distribution to individual pot line cells. Handling as a liquid reduces the possiblity and extent of hydrolysis and of reducing the surface area as well as the possibility of contact with water vapor.

EXAMPLES

The following examples will serve to better illustrate the successful practice of the instant invention.

EXAMPLE I

A mixture of chlorides resembling a typical product of a bauxite chlorination of all oxide components with an inert carrier gas is passed over two packed condensers maintained at uniform temperatures, the first at a temperature higher than the second. In the first condenser, the majority of iron is condensed with some aluminum chloride, and in the second, the majority of aluminum chloride is condensed. Table I gives the input and output concentrations of the two condensers. The activity coefficients of the silicon and titanium tetrachlorides are presented for a series of condensation temperatures in the second condenser.

Although all the activities range well above the Raoultian value 1.0 indicating that the solid solution is lower than would be expected from compatible compounds, the titanium and silicon content on a metal basis is still well beyond the purity which is needed for cell feed. Table I gives the impurity content on a metal basis. Further purification must be used beyond partial condensation of the various impurities.

EXAMPLE II

A stream of mixed chlorides from a total bauxite chlorination process is cooled after the introduction of iron powder to reduce the iron chloride to ferrous chloride. The stream is cycloned after cooling to a temperature above the "snow point" of the aluminum chloride and passed through a cyclone which removes the solid iron chloride and its aluminum complexes and other solids. The gases are then passed downward into a heated column of salt supported on ceramic packing to avoid channelling. The liquid complex is removed below, cooled and analysed for silicon and titanium tetrachlorides and iron chloride. Table II gives the operating conditions and analytical limits.

In practical application, spent cell melt would be recycled after collection from individual cell overflows and lifted to a reservoir feeding a packed tower where countercurrent gas liquid flow stripped the chlorinator gases of aluminum chloride values without taking into the cell melt significant amounts of either titanium or silicon tetrachloride. The outgoing enriched alkali aluminum chloride complex would be near but above a 1/1 alkali chloride aluminum chloride ratio and would be at a temperature above 300° C. The preferred operating temperature will depend upon the alkali chloride mixture employed in the cell and might range from the melting point of the complex to a temperature well above the cell temperature, limited by the vapor pressure of the alkali complex and the losses attendent upon a vaporous aluminum chloride complex escaping with the uncomplexed chlorides and combustion gases. Most preferred are salt melt outlet temperatures between 300° and 500° C.

The purification is dependent upon the complete removal of iron chloride from the chlorinator gas stream in a step upstream of the salt complexing stage. This purification may be aided by a double stage chlorination in which the iron content is significantly reduced before a second chlorination, the exiting chlorides of which are subjected to alkali complexing.

TABLE I

PARTIAL CHLORIDE CONDENSATION
EXAMPLE I

| Inlet Temp °C. | Cond. Temp. °C. | MOL % SiCl$_4$ | MOL % TiCl$_4$ | Activity Coefficient SiCl$_4$ | Activity Coefficient TiCl$_4$ | PPM Si, | PPM Ti*** |
|---|---|---|---|---|---|---|---|
| *155 | 70 | .12 | 2.73 | 6.86 | 4.16 | 625 | 24,233 |
| 155 | 90 | .10 | 1.64 | 4.61 | 3.63 | 520 | 14,558 |
| 155 | 120 | .09 | .37 | 2.40 | 6.89 | 468 | 3,284 |
| 185 | 70 | .14 | 2.59 | 5.85 | 4.34 | 729 | 22,990 |
| **130 | 70 | .11 | .64 | .36 | 1.02 | 573 | 5,681 |

*Inert Gas/Al$_2$Cl$_6$ Ratio = 7.3
**Inert Gas/Al$_2$Cl$_6$ Ratio = 153
***Metal Basis

TABLE II

| Al$_2$Cl$_6$ CONDENSATION BY NaCl MELT EXAMPLE II | |
|---|---|
| Salt Bed Temp. | 332° C. |
| Gas Inlet Temp | 245° C. |
| Gas Inlet Analysis | |
| Al$_2$Cl$_6$ | 25.0 MOL % |
| TiCl$_4$ | 1.0 MOL % |
| SiCl$_4$ | 2.7 MOL % |
| Non-Condensible | 71.3 MOL % |
| Gas Inlet Pressure | 3 PSIG |
| Outlet Salt Complex | NaCl$_x$—NaAlCl$_4$y |
| Impurity Ratio (Metal Basis) | |
| Ti/Al | <20 PPM |
| Si/Al | <2 PPM |

What is claimed is:

1. A method for producing aluminum chloride suitable for direct introduction into an aluminum chloride reduction cell by treatment of the gas stream emerging from an aluminum value source chlorination process comprising the steps of:
   1. reducing and condensing iron chloride in one or more iron chloride condensation stages;
   2. absorbing the aluminum chloride contained in the gas stream under high temperature conditions with an alkali chloride or alkali chloride mixture in an at least 1/1 ratio to form an ionic aluminum chloride-alkali chloride complex; and
   3. selectively condensing the chlorides from the product by step (2) to produce a purified aluminum chloride-alkali chloride complex suitable for direct introduction into an aluminum chloride reduction cell.

* * * * *